J. G. MAXWELL.
WHEEL.
APPLICATION FILED OCT. 10, 1907.
927,259.
Patented July 6, 1909.
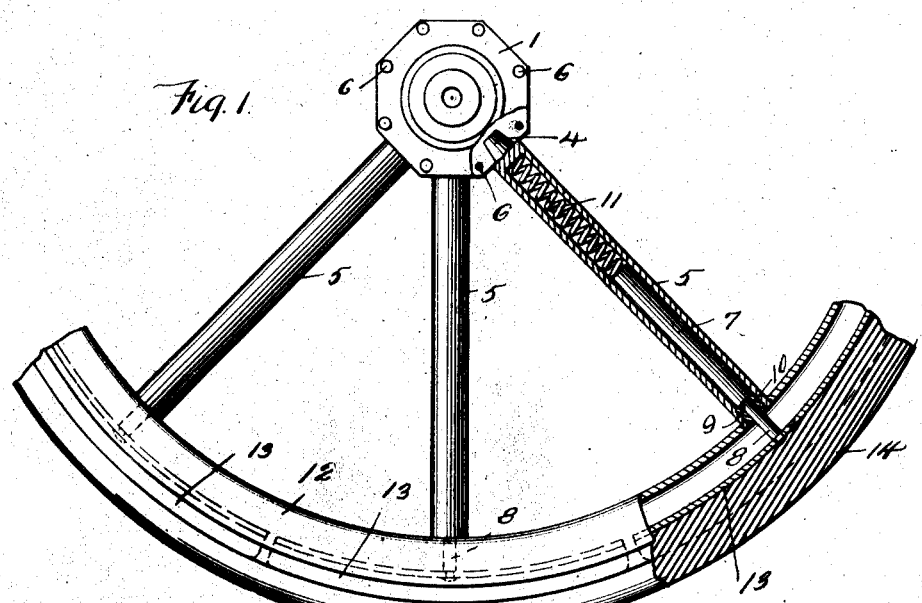
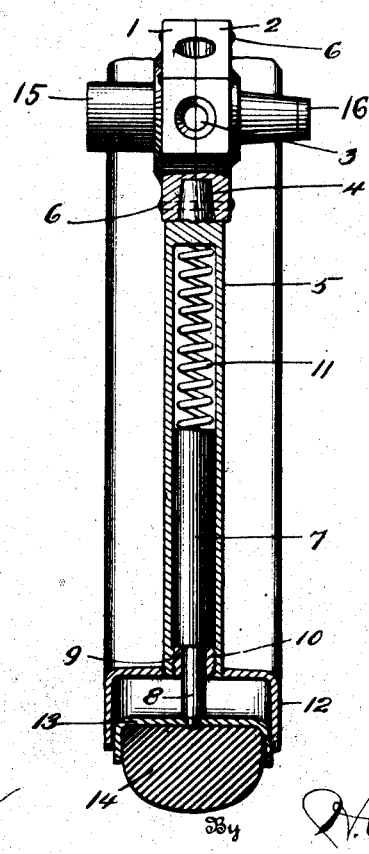

UNITED STATES PATENT OFFICE.

JAMES G. MAXWELL, OF WASHINGTON, PENNSYLVANIA.

WHEEL.

No. 927,259.　　　Specification of Letters Patent.　　　Patented July 6, 1909.

Application filed October 10, 1907. Serial No. 396,837.

*To all whom it may concern:*

Be it known that I, JAMES G. MAXWELL, a citizen of the United States, residing at Washington, county of Washington, and State of Pennsylvania, have invented certain new and useful Improvements in Wheels, of which the following is a specification, reference being had therein to the accompanying drawings.

This invention relates to wheels, especially adapted for use upon motor vehicles, and its primary object is to provide a resilient or cushioned wheel of strong, effective and durable construction.

Another object of this invention is to provide a wheel that will not skid when a vehicle equipped with the same is passing around a curve.

A further object of the invention is to provide a wheel with a tire which cannot be punctured, and which at the same time will possess the resiliency of the ordinary pneumatic tire.

The invention comprises a wheel provided with tubular spokes, a rim carried by said spokes, spring pressed plungers within said spokes, a plurality of follower-plates secured to the outer ends of said plungers, and a solid elastic tire secured to said follower-plates.

The invention also includes a wheel hub of novel form, and improved means for securing the spokes thereto.

The construction of the improvement will be fully described hereinafter in connection with the accompanying drawing which forms a part of this specification, and its novel features of construction will be set forth in the appended claims.

In the drawing: Figure 1 is a fragmentary side elevation partly in section, and partly broken away, of a wheel embodying the invention, and Fig. 2 is a longitudinal transverse section of the same.

The wheel hub preferably consists of separable sections 1 and 2, each formed with semi-circular openings which register to provide radial tapered sockets 3 to receive tapered tenons 4 projecting from the inner ends of tubular spokes 5. The hub sections 1 and 2 are connected by bolts 6 which also secure the tenons 4 within the sockets 3. Within each of the hollow spokes is a cylindrical plunger 7 circumferentially reduced at its outer end 8 to form a shoulder 9. The outer open end of each of the spokes is internally screw-threaded to receive a threaded bushing 10 against which the shoulder 9 bears to limit the outward movement of the plunger. A coil spring 11 is interposed between the inner end of each plunger, and the inner closed end of the spoke, said springs serving to project the plungers outward. A rim 12 of U-shape in cross section is secured to the outer ends of the spokes 5, said rim being formed with threaded openings to receive the spokes. To the reduced outer end 8 of each of the plungers is secured a follower-plate 13 also of U-shape in cross-section, and adapted to fit within the rim 12, as shown in Fig. 2. A solid tire 14 preferably of rubber is fitted within the groove formed by the U-shaped follower-plates. The hub sections are provided with suitable bearings 15 and 16 for the vehicle axle connections.

The utility and operation of the wheel constructed as thus described will be readily understood. As the tire 14 is solid all liability of annoyance by punctures is avoided. The yielding of the plungers 7 against the tension of the springs 11 imparts the desired resiliency to the tire, and as each of the plungers acts independently, a continuous yielding or cushioning of the tire is insured.

Having now described my invention what I claim as new, is:—

A wheel comprising a hub, hollow tubular spokes having their inner ends closed and secured to said hub, a rim substantially U-shaped in cross section having the outer open ends of said spokes threaded therein, a follower-member extending with said rim, a tire secured within and projecting from said member, a bushing threaded in the outer open end of each of said spokes and constituting a stop, a plunger mounted in each of said spokes and having a reduced outer end extending through the bushing and directly secured to said member, said enlarged portions of said plungers adapted to abut against said bushing whereby the outward movements of the plunger are arrested, and a compression spring within each of the spokes interposed between the inner end of the piston and the closed end of the spoke, said spring normally maintaining the follower projected.

In testimony whereof I affix my signature in the presence of two witnesses.

JAMES G. MAXWELL.

Witnesses:
C. M. HORNBAKE,
ED. S. FOSTER.